United States Patent [19]

Wykowski

[11] Patent Number: 5,272,197
[45] Date of Patent: Dec. 21, 1993

US005272197A

[54] STORAGE-STABLE UNSATURATED THERMOSETTABLE RESINS AND CURED PRODUCTS

[75] Inventor: Paul L. Wykowski, Lake Jackson, Tex.

[73] Assignee: The Dow Chemical Company, Midland, Mich.

[21] Appl. No.: 861,685

[22] Filed: Apr. 1, 1992

Related U.S. Application Data

[63] Continuation-in-part of Ser. No. 464,491, Jan. 12, 1990, abandoned.

[51] Int. Cl.$^5$ .............................................. C08J 5/08
[52] U.S. Cl. .................................... 524/358; 525/531; 525/922

[58] Field of Search ................. 524/359, 358; 525/922, 525/531

[56] References Cited

U.S. PATENT DOCUMENTS 3,553,293 1/1971 Stahly et al. ...................... 525/922
4,594,398 6/1986 Nelson et al. ...................... 525/522

Primary Examiner—Joseph L. Schofer
Assistant Examiner—Peter Mulcay

[57] ABSTRACT

Thermosettable ethylenically unsaturated resins are rendered storage stable by the addition of at least one 1,4-naphthoquinone substituted on the 2 or 3 or both the 2 and 3 positions. The reactivity of these storage stable resins with curing agents is not unacceptably reduced by the presence of the stabilizer.

10 Claims, No Drawings

STORAGE-STABLE UNSATURATED THERMOSETTABLE RESINS AND CURED PRODUCTS

CROSS-REFERENCE TO RELATED APPLICATION

This application is a continuation-in-part of application Ser. No. 07/464,491 filed Jan. 12, 1990 abandoned which is incorporated herein by reference in its entirety.

FIELD OF THE INVENTION

The present invention concerns an additive for thermosettable resins, such resins containing the additive, curable compositions and articles prepared therefrom.

BACKGROUND OF THE INVENTION

Many types of inhibitors are employed to enhance the shelf-stability of liquid thermosettable resins such as unsaturated polyester resins and vinyl ester resins. Examples of these inhibitors include hydroquinone and its alkylated derivatives, phenolic compounds with electron-withdrawing substituents such as nitro, nitroso, or halo moieties, and quinonoid compounds such as para-benzoquinone or para-chloranil.

These compounds enhance the shelf stability of the resin by preventing premature polymerization resulting in the resin becoming an unusable gelatinous mass during storage. However, the addition of such inhibitors to the resin formulation also reduces the ability of the resin to effectively cure during processing. Normally, the shelf stability of the resin must be balanced against the reactivity required for the intended application.

Some of this loss in reactivity may be overcome by the addition of accelerators such as N,N-dimethylaniline, N,N-dimethyl-para-toluidine, or N,N-dimethylacetoacetamide. These compounds accelerate the rate of initiator decomposition and thereby enhance the rate of curing. However, many of these accelerators are unstable if used as an additive in a pre-formulated resin, and may "poison" the cure of the resin by decomposing the initiator too quickly and providing too many radicals of low molecular weight which then forms an incompletely cured resin.

Quinonoid compounds have long been known to be most effective polymerization inhibitors; however, their use as shelf-stability enhancers have been severely limited by their drastic reduction of the desired polymerization rate and would require an impractical amount of initiator and accelerator to effectively complete the curing process. However, the presence of suitable electron-withdrawing groups to the 2 or 3 position on a 1,4-naphthoquinone reduces the adverse effect on reactivity while maintaining suitable storage stability.

It would therefore be desirable to have available storage stable thermosettable ethylenically unsaturated resins which also have suitable reactivity rates with curing agents therefor.

SUMMARY OF THE INVENTION

One aspect of the present invention pertains to a polymerization inhibitor concentrate which comprises (1) at least one polymerizable ethylenically unsaturated monomer; and (2) at least one 1,4-naphthoquinone substituted on the 2 or 3 or both the 2 and 3 positions.

Another aspect of the present invention pertains to a polymerization inhibitor concentrate which comprises (1) at least one thermosettable ethylenically unsaturated resin; and (2) at least one 1,4-naphthoquinone substituted on the 2 or 3 or both the 2 and 3 positions.

Another aspect of the present invention pertains to a storage stable thermosettable ethylenically unsaturated resin composition comprising (1) at least one vinyl ester resin resulting from reacting a polyepoxide with an unsaturated monocarboxylic acid; and (2) at least one 1,4-naphthoquinone substituted on the 2 or 3 or both the 2 and 3 positions; wherein component (2) is present in an amount sufficient to render the composition storage stable.

Another aspect of the present invention pertains to a curable composition comprising (I) a resin composition comprising (1) at least one vinyl ester resin resulting from reacting a polyepoxide with an unsaturated monocarboxylic acid; and (2) at least one 1,4-naphthoquinone substituted on the 2 or 3 or both the 2 and 3 positions; wherein component (2) is present in an amount sufficient to render a composition containing component (I) free of component (II) storage stable; and (II) a curing amount of at least one curing agent for component (I).

A further aspect of the present invention pertains to an article resulting from curing the aforementioned curable compositions.

The present invention provides storage stable thermosettable ethylenically unsaturated resins which also have suitable reactivity rates with curing agents therefor.

DETAILED DESCRIPTION OF THE INVENTION

The polymerization inhibitor concentrate compositions of the present invention which comprise (1) at least one polymerizable ethylenically unsaturated monomer; and (2) at least one 1,4-naphthoquinone substituted on the 2 or 3 or both the 2 and 3 positions usually contain from about 50 to about 99.9, preferably from about 90 to about 99.9, more preferably from about 95 to about 99.9 percent by weight of component (1) based upon the combined amount of components (1) and (2) and from about 0.1 to about 50, preferably from about 0.1 to about 10, more preferably from about 0.1 to about 5 percent by weight of component (2) based upon the combined amount of components (1) and (2).

The polymerization inhibitor concentrate compositions of the present invention which comprise (1) at least one thermosettable ethylenically unsaturated resin; and (2) at least one 1,4-naphthoquinone substituted on the 2 or 3 or both the 2 and 3 positions usually contain from about 50 to about 99.9, preferably from about 90 to about 99.9, more preferably from about 95 to about 99.9 percent by weight of component (1) based upon the combined amount of components (1) and (2) and from about 0.1 to about 50, preferably from about 0.1 to about 10, more preferably from about 0.1 to about 5 percent by weight of component (2) based upon the combined amount of components (1) and (2).

In the storage stable thermosettable ethylenically unsaturated resin composition comprising (1) at least one thermosettable ethylenically unsaturated resin; and (2) a complex formed from (a) at least one quinonoid compound and (b) at least one imidazole compound, component (2) is present in an amount sufficient to render the composition storage stable, usually contain from about 5 to about 20,000, preferably from about 50 to about 10,000, more preferably from about 100 to about 5,000 parts per million by weight (ppm) of component (2) based upon the combined amount of components (1) and (2).

Suitable quinonoid compounds which can be employed herein include any polynuclear ring compounds containing two ketone oxygen atoms in the molecule. Likewise, the term "quinonoid" as employed herein means a compound which is a mononuclear or polynuclear ring compound which contains two ketone oxygen atoms attached to different carbon atoms in the ring in mononuclear ring compounds or different carbon atoms in the same ring or a different ring in polynuclear compounds. The term "polynuclear" means a compound containing more than one ring structures. It is preferred that the "polynuclear" compounds be composed of fused rings.

The 1,4-naphthoquinone compounds substituted in the 2 or 3 or both the 2 and the 3 positions can provide the ethylenically unsaturated resin with enhanced storage stability with a suitable reactivity for some applications. A particularly suitable such compound is 2,3-dichloro-1,4-naphthoquinone, 2,3-dibromo-1,4-naphthoquinone, 2,3-dicyano-1,4-naphthoquinone, 2- chloro-1,4-naphthoquinone, 2-bromo-1,4-naphthoquinone, 2-nitro-1,4-naphthoquinone, 2,3,6,7,8,9-hexachloro-1,4-naphthoquinone, 3-bromo-2-chloro-1,4-naphthoquinone, any combination thereof and the like.

If desired, the stabilizers of the present invention can be employed in combination with the known stabilizers such as, for example, 1,4-hydroquinone, 4-tertiary-butylcatechol, 4-methoxyphenol, methylhydroquinone, 4-chloro-2-nitrophenol, 2,4-dinitropara-cresol,2,4-dinitrophenol, phenothiazine, oxalic acid, maleic acid, combinations thereof and the like. When employed, these known stabilizers are employed in an amount of from about 5 to about 5,000, preferably from about 25 to about 1,000, more preferably from about 50 to about 400 parts per million based upon the combined weight of thermosettable resin, polymerizable ethylenically unsaturated monomers and stabilizers.

If desired, the stabilizers of the present invention can be employed in combination with known electron donors which form electron-donor-acceptor complexes such as, for example, 1-methylimidazole, 2-methylimidazole, 2-ethyl-4-methylimidazole, 2-heptadecylimidazole, 2-isopropylimidazole, 2-(2-ethyl-4-methylimidazyl)-1-cyanoethane, 2-undecylimidazole, any combination thereof and the like.

Particularly suitable thermosettable resins which contain ethylenically unsaturated groups which can be employed herein include, for example, vinyl ester resins, unsaturated polyester resins, vinyl urethane resins, combinations thereof and the like.

Particularly suitable vinyl ester resins include, for example, those prepared by reacting a polyepoxide with an unsaturated monocarboxylic acid. The polyepoxide and unsaturated monocarboxylic acid are usually reacted in amounts which provides a ratio of carboxyl groups per epoxide group of from about 0.9:1 to about 1.1:1, preferably from about 0.95:1 to about 1.05:1, more preferably from about 0.98:1 to about 1.02:1. Particularly suitable such vinyl ester resins and methods for their preparation are disclosed in U.S. Pat. Nos. 3,367,992: 3,066,122; 3,179,623; 3,301,753; 3,256,226; 3,564,074; 3,892,819; 4,407,991 and 4,594,398; all of which are incorporated herein by reference in their entirety.

Also suitable are the vinyl ester resins which contain dicyclopentadiene or other dienes and oligomers thereof as described by Nelson et al. in U.S. Pat. Nos. 4,525,544 and 4,594,398 which are incorporated herein by reference in their entirety.

The vinyl ester resins can be modified with any suitable rubber or elastomer. Suitable rubbers or elastomers include, for example, carboxyl-containing rubbers or elastomers, copolymers of alkyl acrylates or methacrylates or alkyl esters of other alpha-alkyl rubber particles characterized by having a rubbery core and a grafted polymer shell which is compatible with vinyl ester resins. Vinyl ester resins can be modified with a carboxyl-containing rubber or elastomer by the method disclosed by D. J. Najvar in U.S. Pat. No. 3,892,819 which is incorporated herein by reference. These rubbers or elastomers containing acrylate, vinyl, secondary amine groups, or carboxyl-containing moieties are commercially available from the B. F. Goodrich Company under the tradename of HYCAR.

Other particularly suitable forms of rubber or elastomer for modification of the vinyl ester compositions of the present invention include poly(alkylacrylate) or poly(alkylmethacrylate) polymers as produced by the methods disclosed by D. K. Hoffman et al. in U.S. Pat. No. 4,690,988, monomers polymerized in situ in the epoxy resin to form a stable polymer phase as disclosed by D. Hoffman and C. Arends in U.S. Pat. No. 4,708,996 issued Nov. 24, 1987 and also by R. E. Adam et al. in U.S. Pat. No. 4,524,181, and rubbers or elastomers available in the form of grafted rubber concentrates as described by D. E. Henton, et al. in copending application Ser. No. 002,535 filed Jan. 12, 1987 all of which are incorporated herein by reference.

Particularly suitable unsaturated polyester resins include, for example, those prepared by reacting an unsaturated polycarboxylic acid with a polyfunctional alcohol (polyol). Particularly suitable such polyester resins and methods for their preparation include those disclosed is U.S. Pat. Nos. 2,627,510, 2,632,751, 2,945,837, 3,775,513 and 3,901,953, all of which are incorporated herein by reference in their entirety.

Particularly suitable unsaturated vinyl urethane resins which can be employed herein include, for example, those prepared by reacting a hydroxyl terminated polyester resin with a multifunctional isocyanate and a hydroxyalkylacrylate. Particularly suitable such unsaturated vinyl urethane resins and methods for their preparation include, for example, those described in U.S. Pat. Nos. 3,876,726 and 4,287,116, which are incorporated herein by reference in their entirety.

The unsaturated polyester resins and the vinyl urethane resins can also be modified with rubbers or elastomers as described for the vinyl ester resins.

If desired, these thermosettable unsaturated resins can be diluted or blended with a polymerizable ethylenically unsaturated monomer. Suitable such monomers include, for example, vinyl aromatic compounds; saturated or unsaturated aliphatic or cycloaliphatic esters of ethylenically unsaturated monocarboxylic acids wherein the ester portion of the monomer contains from 1 to about 20, preferably from about 1 to about 10, more preferably from about 1 to about 5 carbon atoms and the acid portion of the monomer contains from about 3 to about 10, preferably from about 3 to about 8, more preferably from about 3 to about 4 carbon atoms; combinations thereof and the like. Particularly suitable such polymerizable ethylenically unsaturated monomers include, for example, those disclosed in the aforementioned U.S. Pat. Nos. 3,892,819 and 4,594,398, particularly suitable are aromatic compounds such as, for example, styrene, α-methylstyrene, dichlorostyrene, vinyl naphthalene, vinyl toluene, divinylbenzene, vinyl acetate, vinyl benzoate, vinyl chloroacetate,; unsaturated esters such as esters of acrylic and methacrylic acid, vinyl acetate, vinyl benzoate, vinyl chloroacetate, vinyl laurate and the like; unsaturated acids such as, for example, acrylic acid, alpha-alkylacrylic acid, butenoic acid, allylbenzoic acid, vinylbenzoic acid, and the like; unsaturated organic halides such as, for example, vinyl chloride, vinylidene chloride, and the like; nitriles such as acrylonitrile, methacrylonitrile, and the like, diolefins such as, for example, butadiene, isoprene, methylpentadiene, and the like; esters of polycarboxylic acids such as, for example, diallyl phthalate, divinyl suceinate, diallyl maleate, divinyl adipate, dichloroallyl tetrahydrophthalate, and the like; and any combinations of any two or more of such monomers and the like.

These polymerizable ethylenically unsaturated monomers can be employed in any desired amount so as to reduce the viscosity of the composition; however, they are usually employed in amounts of from about zero to about 60, preferably from about 10 to about 55, more preferably from about 20 to about 50 percent by weight based upon the combined weight of thermosettable unsaturated resin and polymerizable ethylenically unsaturated monomer.

These stabilized thermosettable unsaturated resins can be cured with conventional curing agents or curing catalysts which generate free radicals such as, for example, organic peroxides, azo compounds, combinations thereof and the like. Particularly suitable such curing agents or curing catalysts include, for example, the peroxides such as, for example, benzoyl peroxide, tertiary-butyl hydroperoxide, ditertiary-butyl peroxide, hydrogen peroxide, potassium persulfate, methyl cyclohexyl peroxide, methyl ethyl ketone peroxide, cumene hydroperoxide, acetyl benzoyl peroxide, tetralin hydroperoxide, phenylcyclohexane hydroperoxide, tertiary-butyl perbenzoate, ditertiary-amyl perphthalate, ditertiary-butyl peradipate, tertiary-amyl percarbonate, bis(4-tertiarybutylcyclohexyl)peroxydicarbonate, and the like; and azo compounds such as, for example, 2,2'-azobisisobutyronitrile, dimethyl-2,2'-azobisisobutyrate, 2,2'-azobis(2,4-dimethylvaleronitrile, 2,2'-azobisisotolylamide, and the like. Combinations of any two or more of the above curing catalysts or curing agents can be employed if desired.

These curing agents are employed in any amount which is sufficient to effect the cure of the stabilized thermosettable unsaturated resins; however, usually amounts of from about 0.1 to about 5, preferably from about 0.1 to about 3, percent by weight based upon total resin weight is sufficient to effect the cure. It should be noted, however, that the optimum amount of curing agent will vary depending upon the curing agent and the stabilized thermosettable unsaturated resin being employed.

If desired, accelerators or promoters for these curing agents or curing catalysts can be employed. Suitable such accelerators or promoters include metal salts of carboxylic acids such as, for example, cobalt naphthenate, or vanadium neodecanoate either alone or in combination with tertiary amines such as, for example, N,N-dimethylaniline, N,N-diethylaniline, N,N-dimethylacetoacetamide, N,N-dimethyl-para-toluidine, and the like.

The accelerators are suitably employed in amounts of from about 0.02 to about 1, more suitably from about 0.05 to about 0.6 percent by weight based on total resin weight.

If desired, the compositions of the present invention can contain reinforcing materials in the form of mats, woven fabric, unidirectional fibers, rovings. random fibers or filaments, inorganic fillers, inorganic whiskers, hollow spheres, ceramic and glass spheres and the like. These reinforcing materials can be prepared from glass fibers, aramid fibers, graphite fibers, and polymer fibers such as, for example, nylon, polyalkyleneterephthalate, polyethylene, polypropylene, polyesters, combinations thereof and the like.

If desired, other components can be included in the compositions of the present invention, such as, for example, pigments, dyes, fillers, wetting agents, chemical thickeners, fire retardant additives, emission suppressants for monomer vapors, adhesion promoters, and the like. These components are included in amounts which are effective for their purpose, e.g. pigments and dyes are employed in amounts sufficient to color the composition to the extent desired, wetting agents are employed in amounts sufficient to wet out any reinforcing materials present in the composition.

The curable compositions of the present invention can be employed in the preparation of laminates or composites which are useful in the construction of storage vessels, automobiles, airplanes, and other structures and structural parts that can be produced via filament winding, pultrusion, braiding and resin transfer molding. Further uses include, for example, tank and vessel liners, coatings, polymer concrete, potting or encapsulating formulations, and the like.

The following examples are illustrative of the present invention, but are not to be construed as to limiting the scope thereof in any manner.

The following thermosettable resins are employed in the examples.

Thermosettable Resin A is a vinyl ester resin having an acid number not greater than 10, a viscosity at 25° C. of 2200–2700 centistokes, an SPI gel time at 180° F. of 7.0–12.0 minutes, a Gardner color not greater than 4, and a density of 1.068–1.078 g/mL. This resin is commercially available from The Dow Chemical Company as DERAKANE ™ 411-35LI vinyl ester resin bearing lot number AJ890216901.

Thermosettable Resin B is a vinyl ester resin having an acid number not greater than 10, a viscosity at 25° C. of 2200–2700 centistokes, an SPI gel time at 180° F. of 7.0–12.0 minutes, a Gardner color not greater than 4, and a density of 1.068–1.078 g/mL. This resin is commercially available from The Dow Chemical Company as DERAKANE ™ 411-35LI vinyl ester resin bearing lot number AJ890613902.

The following stabilizer compounds are employed in the examples.

Stabilizer Compound A is 2,3-dichloro-1,4-naphthoquinone.

Stabilizer Compound B is 2-hydroxy-1,4-naphthoquinone.

Stabilizer Compound C is 1,4-benzoquinone.

Stabilizer Compound D is 1,4-naphthoquinone.

Other Inhibitors and Additives (OIA) employed in the examples are as follows.

OIA-A is 1-methylimidazole.

EXAMPLES 1-9

Various thermosettable resins are inhibited with various inhibitor compositions. These inhibited compositions are prepared by blending the indicated resin with the indicated inhibitor composition at a temperature of 25° C. In the case of the inhibitor complexes with the imidazole, the complex is formed prior to blending it with the thermosettable resin. The inhibitor complex is formed by blending the electron donor and electron acceptor compounds together at a temperature of 25° C. for about 24 hours.

The blended compositions are given in Table I.

The blended compositions are subjected to the following tests.

STORAGE STABILITY

These compositions are tested for storage stability by placing the composition in a two ounce (59.1 mL) narrow mouth round amber bottle filled to the indicated volume and capping the thus filled bottle with 20 mm tin lined plastic caps. The bottles are placed in an air circulated oven maintained at the indicated temperature. The stability of the resin is checked daily by inverting the bottles. A sample is considered to be gelled and the test terminated when a layer of solid resin remains at the bottom of the bottle or when the sample appears stringy in consistency. The time in days required for the sample to gel is recorded.

Reactivity (Gel Time & Cure Time)

A 0.4 gram sample of benzoyl peroxide curing agent is mixed with 0.2 gram of styrene in a 100 mL tripour beaker. A 40 gram sample of the resin composition is introduced and mixed thoroughly with a wooden spatula. The thus catalyzed resin is poured into each of 18 mm × 150 mm two test tubes to a level of 3 inches (76 mm). The test tubes are allowed to stand for 10 to 20 minutes to be rid of air bubbles. A thermocouple is inserted into the center of the resin composition to one inch (25.4 mm) below the resin surface. The test tube is placed in a constant temperature bath maintained at 150° F. (82.2° C.). The temperature change as a function of time is recorded on a microprocessor. The initial time is marked when the resin is heated to 150° F. (65.6° C.). The time required to reach 190° F. (87.7° C.) is recorded as the gel time. The test is continued until the recorder has run two minutes past the maximum temperature. The maximum temperature is the peak exotherm. The time required to reach the peak exotherm is recorded as the cure time.

The results are given in Table I.

TABLE I

| Component & Property | Ex. 1 | Ex. 2 | Ex. 3 | Ex. 4 | Ex. 5 | Ex. 6 | Ex. 7 |
|---|---|---|---|---|---|---|---|
| Thermosettable Resin | A | B | B | A | A | A | A |
| Stabilizer Compound, | | | | | | | |
| Type | A | A | A | A | A | A | A |
| conc. (ppm) | 286 | 287 | 1,036 | 287 | 400 | 286 | 200 |
| Oxalic Acid Dihydrate, ppm | 203 | — | — | 200 | — | — | — |
| Other Additive, | | | | | | | |
| Type | — | — | — | A | — | — | — |
| conc. (ppm) | | | | 747 | | | |
| Shelf Stability | | | | | | | |
| 94% filled @ 55° C., days | 7 | 8 | 13 | 7 | 10 | 10 | 8 |
| 70% filled @ 55° C., days | 6 | 7 | 12.5 | 8 | 10 | 8 | 6.5 |
| 94% filled @ 43° C., daysA | 28 | — | — | 26 | 35 | 31 | 27 |
| Gel Time, minutes | 6.2 | 12.82 | 13.17 | 6.26 | 8.94 | 8.44 | 8.30 |
| Cure Time, minutes | 8.23 | 15.46 | 16.24 | 7.98 | 11.02 | 10.66 | 10.38 |
| Peak Exotherm, | | | | | | | |
| °F. | 370 | 356 | 340 | 376 | 356 | 363 | 366 |
| °C. | 187.8 | 180 | 171.1 | 191.1 | 180 | 183.9 | 185.6 |

| Component & Property | Ex. 8 | Ex. 9 | C.E. A* | C.E. B* | C.E. C* |
|---|---|---|---|---|---|
| Thermosettable Resin | A | B | A | A | A |
| Stabilizer Compound, | | | | | |
| Type | A | A | B | C | D |
| conc. (ppm) | 100 | 287 | 221 | 136 | 199 |
| Oxalic Acid Dihydrate, ppm | — | — | 200 | 200 | 200 |
| Other Additive, | | | | | |
| Type | — | A | — | — | — |
| conc. (ppm) | | 750 | | | |
| Shelf Stability | | | | | |
| 94% filled @ 55° C., days | 6 | 6.5 | 4 | 3 | 7 |
| 70% filled @ 55° C., days | 7 | 6 | 4 | 4 | 7 |
| 94% filled @ 43° C., days | 18 | — | 14 | 9 | 25 |
| Gel Time, minutes | 8.35 | 10.60 | 7.04 | 11.70 | 8.36 |
| Cure Time, minutes | 10.18 | 12.98 | 10.00 | 13.40 | 10.34 |
| Peak Exotherm, | | | | | |
| °F. | 362 | 360 | 371 | 370 | 370 |
| °C. | 183.3 | 182.2 | 188.3 | 187.8 | 187.8 |

*Not an example of the invention.

The above data clearly illustrates that the stabilizer system of the present invention provides shelf stability for the unsaturated thermosettable resins without an unacceptable decrease in reactivity when the stabilized unsaturated thermosettable resins are blended with a curing agent and cured.

What is claimed is:

1. An article resulting from curing a curable composition comprising (I) a resin composition comprising (1) at least one vinyl ester resin resulting from reacting a polyepoxide with an unsaturated monocarboxylic acid; and (2) at least one 1,4-naphthoquinone substituted on the 2 or 3 or both the 2 and 3 positions with a Cl, Br, nitro or cyano substituent; wherein component (2) is present in an amount from about 5 to 20,000 parts per million parts by weight based upon the combined weight of components (1) and (2); and (II) a curing amount of at least one curing agent for component (I).

2. An article composition of claim 1 wherein component (2) is present in an amount of from about 50 to about 10,000 parts per million parts by weight based upon the combined weight of components (1) and (2).

3. An article composition of claim 1 wherein component (2) is present in an amount of from about 100 to about 5,000 parts per million parts by weight based upon the combined weight of components (1) and (2).

4. An article of claim 1, 2 or 3 which additionally contains at least one polymerizable ethylenically unsaturated monomer.

5. An article of claim 4 wherein said at least one polymerizable ethylenically unsaturated monomer is selected from the group consisting of vinyl aromatic compounds; saturated or unsaturated aliphatic or cycloaliphatic esters of ethylenically unsaturated monocarboxylic acids wherein the ester portion of the monomer contains from 1 to about 20 carbon atoms and the acid portion of the monomer contains from about 3 to about 20 carbon atoms; any combination thereof and the like.

6. An article of claim 5 wherein said at least one polymerizable ethylenically unsaturated monomer selected from the group consisting of vinyl aromatic compounds.

7. An article of claim 6 wherein said at least one polymerizable ethylenically unsaturated monomer is selected from the group consisting of styrene, vinyl toluene, α-methylstyrene, divinylbenzene, vinyl naphthalene, dichlorostyrene, any combination thereof and the like.

8. An article of claim 1, 2 or 3 wherein component (2) is 1,4-naphthoquinone substituted on the 2 or 3 or both the 2 and 3 positions with a Cl substituent.

9. An article of claim 8, wherein component (2) is 2,3-dichloro-1,4-naphthoquinone.

10. An article of claim 9 wherein said thermosettable ethylenically unsaturated resin is a vinyl ester resin; and said curing agent is a peroxygen containing compound.

* * * * *